United States Patent [19]

Lester

[11] 4,035,895

[45] July 19, 1977

[54] METHOD OF MAKING COMPOSITE MOTORCYCLE WHEEL

[75] Inventor: Thomas J. Lester, Aurora, Ohio

[73] Assignee: The Lester Tire Company, Bedford Hts., Ohio

[21] Appl. No.: 734,242

[22] Filed: Oct. 20, 1976

Related U.S. Application Data

[60] Division of Ser. No. 648,954, Jan. 14, 1976, which is a continuation-in-part of Ser. No. 555,052, March 3, 1975, abandoned.

[51] Int. Cl.² .............................................. B21K 1/34
[52] U.S. Cl. ........................... 29/159.03; 29/159.01; 29/447; 29/527.6; 301/6 V; 301/65
[58] Field of Search .......... 29/159.03, 159.02, 159.01, 29/159.3, 527.5, 527.6, 447; 152/DIG. 17; 249/56; 228/135; 301/6 V, 6 CS, 63 R, 63 PW, 64 R, 64 SD, 65, 62, 95-98, 105 R

[56] References Cited

U.S. PATENT DOCUMENTS

| 1,090,743 | 3/1914 | Morat | 301/65 |
|---|---|---|---|
| 1,664,822 | 4/1928 | Kistler | 29/447 |
| 1,779,476 | 10/1930 | Kay | 29/159.01 |
| 2,016,435 | 10/1935 | Isidin | 29/447 |
| 2,998,282 | 8/1961 | Mayer | 301/5 B |
| 3,709,561 | 1/1973 | DeBiasse | 301/6 V X |
| 3,838,485 | 10/1974 | Oldford | 29/159.01 X |

FOREIGN PATENT DOCUMENTS

| 803,457 | 2/1951 | Germany | 301/64 R |
|---|---|---|---|

Primary Examiner—Victor A. DiPalma
Attorney, Agent, or Firm—Donnelly, Maky, Renner & Otto

[57] ABSTRACT

A lightweight composite motorcycle wheel construction characterized in that it comprises a wheel unit casting including concentric outer and inner rim and sleeve portions integrally connected together by angularly spaced spokes; and a hub unit casting having an interference fit within the bore of the sleeve portion thus to frictionally retain the hub and wheel units together against relative angular and axial movement while the bearing receiving bore in the hub unit is located and held coaxially of said rim portion, the wheel and hub units additionally being welded together to prevent relative angular and axial movement despite application of torque and axial loads exceeding the frictional resistance of the interference fit.

4 Claims, 14 Drawing Figures

METHOD OF MAKING COMPOSITE MOTORCYCLE WHEEL

RELATED APPLICATION

This is a division, of application Ser. No. 648,954, filed Jan. 14, 1976, which application is a continuation-in-part of Application Ser. No. 555,052, now abandoned, filed Mar. 3, 1975.

BACKGROUND OF THE INVENTION

Historically, all commercially produced motorcycles have been equipped with wire spoke wheels which are relatively light in weight and which have adequate strength and resilience in normal operation of the motorcycle.

Wire spoke wheels, however, have certain disadvantages such as the necessity of using a tire inner tube, the necessity of periodic tightening of the spokes to avoid unsafe riding and handling conditions of the vehicle, the abrasion of the tire inner tube, and the danger of puncturing the tire inner tube by the head of a broken spoke.

Moreover, wire wheels have an inherent weakness when subject to severe impacts, such as when crossing chuckholes or bumps. Although wire spokes are effective against tensile forces absorbed in the side of the wheel away from the impact, they do not function against compression forces and thus do not provide radial support of the rim in resisting deformation at the point along the rim perimeter subjected to severe impact. In leaning a motorcycle on curves at high speeds, the rims of wire spoke wheels are especially stressed and tend to twist relative to the neutral axis of the rim. Hence, the warping of rims, the fracturing of rims along circumferential break lines, the stretching and loosening of spokes that are commonplace under severe service conditions are important as a basis for improvements in the manufacturing of motorcycle wheels.

In departing from wire wheel construction for motorcycles, lightweight construction must be maintained through the use of lightweight metals such as aluminum, magnesium, or alloys thereof. In any attempt to construct motorcycle wheels from these metals, this invention is based on the premise that it is most practical from a commercial standpoint to make the wheels as castings. It is known that there have been attempts to manufacture motorcycle wheels in the form of light metal castings. These efforts have been generally unsuccessful, particularly in building wheels for the medium to large size motorcycles. An insurmountable difficulty in forming wheels as a single casting, probably attributable to the wheel configuration itself, is the tendency to have porous rims if the hubs are good and, if the casting practice is changed to get good rims, then the hubs are porous.

Porous metal is weak and prone to cracking or yielding in the high stress areas of the rim or in those portions of the hub which support bearing races, etc. Porous metal is further unacceptable in the rims of wheels used with tubeless tires since the sealing compounds normally used on rim surfaces do not seal this type of porosity. Moreover, porosity is unacceptable in any portion of the wheel which must be threaded to receive cap screws or other threaded elements.

Yet another difficulty encountered with wheels formed of a single casting is the inevitable presence of shrink fractures which are believed due to shrinkage of the hub portion to a greater extent than the rim portion.

Nonetheless, there is great inducement to equip motorcycles with wheels formed from lightweight metal castings because there is a great need to reduce the unsprung weight of motorcycles. For example, a cast aluminum alloy wheel according to the invention can be substantially lighter than a wire wheel of the same tire size and permits the use of a tubeless tire. The elimination of the inner tube results in a further ten to fifteen percent reduction of total wheel weight.

Another problem that arises in the casting of motorcycle wheels is the complicated web structures of many rear wheel hubs. Such hubs, if formed of a lightweight metal, must frequently contain steel or iron insets which provide such elements as brake drum surfaces and bearing race supports. Most rear wheel hubs define recesses for rubber drive compensators. Some hubs have bosses to which brake discs may be applied.

Hence, objects of the invention are: to provide lightweight wheels for motorcycles which are superior in strength, road life and freedom from maintenance, labor, and cost when compared with conventional wire spoke wheels.

A further object is to provide motorcycle wheels of a design enabling the casting thereof by technologically modern methods, such as those employing the use of permanent molds in the casting of such lightweight metals as aluminum, magnesium, and alloys thereof, and to use casting technology which will permit the use of weldable lightweight metals and alloys in casting the wheels.

It is a further object to adopt a method of casting motorcycle wheels which avoids porous metal formation in the castings.

An object also is to provide a wheel unit having a central open region of standard dimension suitable for receiving a variety of hub assemblies insertable thereunto which enables use of a standard wheel unit with hub assemblies of standard exterior configuration but which may vary as to brake design, power coupling and the like.

Another object ancillary to the foregoing object is to achieve a wheel design which substantially reduces the cost of molds through the use of a standard wheel unit with a variety of hub units thereby obviating the necessity for providing an equal variety of complete wheel molds.

An object ancillary to the foregoing object is to devise a wheel uniquely adapted for mass production assembly methods enabling assembly of two basic interchangeable parts.

A further object is to design a motorcycle wheel which achieves the foregoing functional objects with such visual features as to be commercialy acceptable to the trade.

SUMMARY OF THE INVENTION

In attempts to cast whole motorcycle wheels of lightweight weldable aluminum and magnesium alloys, it has been discovered that a round wheel casting cannot be obtained if the center opening of the wheel is less than about four inches in diameter.

The above objects and others that may be apparent hereinbelow are achieved in a vehicle wheel, especially a motorcycle wheel, which comprises two basic portions, i.e., a wheel unit and a hub unit of which the wheel unit comprises a rim, an inner tubular element, and radial spokes integrally joined with the rim and tubular element and of which the hub unit has an interference fit in the bore of the tubular element to coaxially locate the bearing receiving bore of the hub unit with respect to the rim and to frictionally retain the wheel and hub unit against relative rotation and relative axial movement.

Another feature of the invention is that the high-strength rim section of the wheel unit has bead retaining side walls of which each defines an outward axially-facing substantially planate surface undercut at least along substantial portions of the side wall by a concentric groove which divides a radially outer part of the planate surface from a radially inner part thereof.

DETAILED DESCRIPTION OF THE PREFERRED EMBODIMENT

Figure 1:
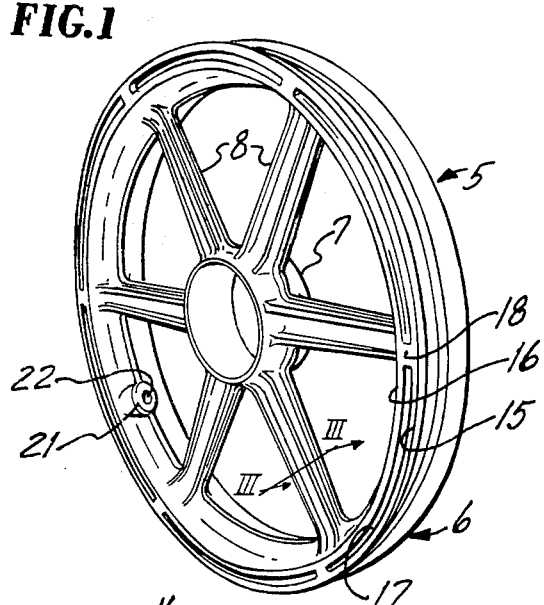
FIG. 1 is a perspective view of a portion of a wheel in accordance with one form of the invention, i.e., a wheel unit having spokes radiating along a common diametral transaxial plane.

FIGS. 1, 2, 3 and 7 relate to one of the two basic components of the improved wheel described herein, i.e., a wheel unit 5. Unit 5, in its preferred form, is a one-piece casting which, when used in a wheel for a motorcycle or other stringent use, is preferably cast from a lightweight weldable metal such as aluminum, magnesium or alloys thereof by permanent mold casting. For less strenuous uses, wheel units embodying the design of unit 5 may be produced from moldable plastic materials including reinforced plastics by well-known molding methods.

As shown, the unit 5 comprises a rim 6, a sleeve-like or tubular hub element 7 and spokes 8. The spokes 8 join integrally with both the hub element 7 and the rim 6 to form a onepiece structure. The rim 6 comprises sidewalls 11, 12 joined by a center wall 14. As shown, the sidewalls are of mirror image similarity with each sidewall having a laterally outward facing side surface having portions 15, 16 at different radii separated along at least substantial portions of the circumference of the rim by a circular groove, or a series of arcuate groove segments 17. As shown, surface portions 15, 16 lie essentially in respective side planes of the rim perpendicular to the wheel axis N—N and extend substantially over the full radial width of respective side walls. It is found that the groove construction of the rim sidewalls contributes greatly to the strength and road life of the wheel by eliminating stress concentrations which ordinarily occur in the center wall 14 in the region between the sidewall and the spokes 8. The grooved sidewall also contributes greatly to the beam strength of the rim between intersections of adjacent spokes with the rim and causes bending of the rim in the region of the sidewalls 11, 12 to be a rarity.

It may be noted that the groove 17 is interrupted adjacent the intersections of the spokes with the rim by filled-in areas 18. Areas 18 are useful as points of engagement for mold ejection pins.

The radially outer surface of the centerwall 14 of the rim has the usual drop center cross sectional contour for enabling the removal of pneumatic tires. The rim 6 is centrally apertured through a radially inwardly extending boss 21 having an opening 22 through which a valve stem is normally installed. The sidewalls and center wall of the rim form an impermeable barrier to air. With a valve stem installed in opening 22 and a tire mounted with its beads in airtight contact with the inner surfaces of walls 11 and 12, the air is retained by the tire on the rim without the aid of an inner tube, an importnt innovation in the use of motorcycle wheels.

Figure 3:
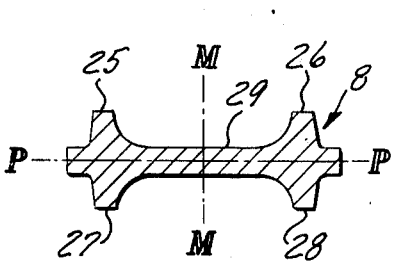
FIG. 3 is a cross section of a spoke taken along line III—III of FIG. 1.

The spokes 8, as indicated by the cross section of FIG. 3, are of I-beam construction each of which tapers or decreases in cross section along their full length outwardly from the hub element 7 to the rim 6. As shown by FIG. 3, the spokes extend in radial planes M—M parallel to, and containing, the axis N—N. The I-beam construction of the spokes contributes greatly to the strength of the wheel disclosed herein and to a wheel strength substantially greater than the conventional wire spoke wheel. From FIG. 3, it may be seen that the spokes 8 are "drafted" with respect to a mold parting line P—P. The term "parting line" is used herein as normally used in the molding trades and refers to a plane or area along which two adjacent mold sections or halves may part. Parting of the molds is facilitated by designing all parts of a casting so that molded surfaces of a casting are at no less than a minimum inclination with respect to the mold parting direction as to cause the mold to break away and separate from the molded article at the slightest movement of the mold sections along their path of departure. The "minimum angle" just referred to is what is known in the trade as draft and is an important feature in the wheel units of this invention. Thus it will be noted that the flange portions 25, 26, 27, 28 taper outwardly in a direction away fromtheir connecting web 29 and the parting line or plane P—P. This is also true of the rim 6 along its surfaces 31, 32 and along outer surfaces 33, 34 of the hub element 7. An inner surface 35 of the hub element shown in dot-dash outline is normally cast with draft and then machined to obtain the finished cylindrical surface 36.

Figure 7:
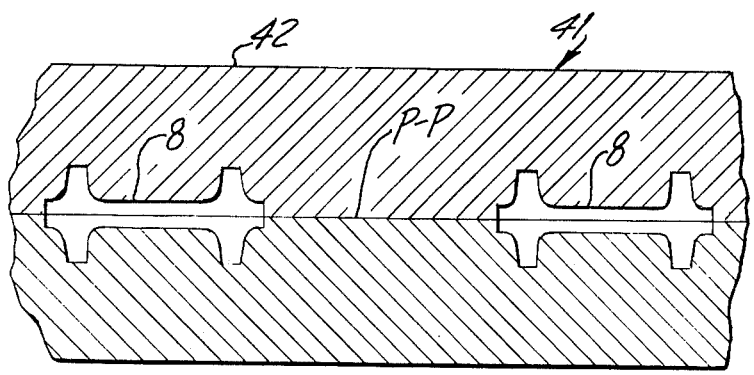
FIG. 7 is a fragmentary schematic cross section of a portion of a mold in enveloping relation with a pair of spokes of the wheel of FIG. 1 as viewed along a surface of revolution concentric to the wheel unit axis.
Figure 8:
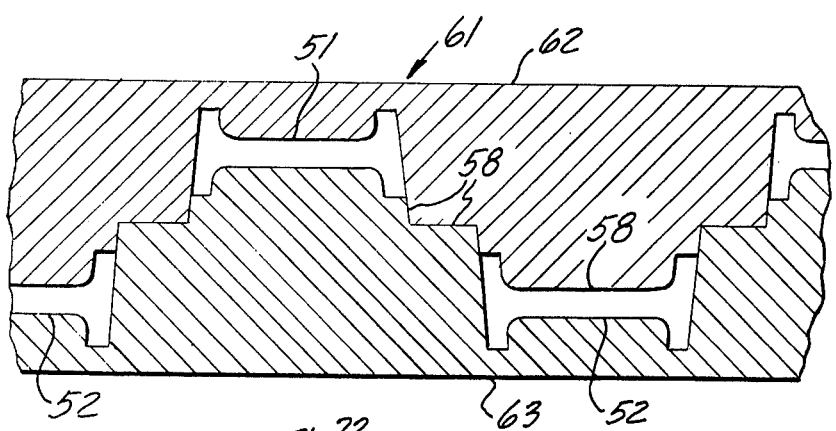
FIG. 8 is a fragmentary schematic cross section of a portion of a mold in enveloping relation with spokes of the wheel of FIG. 4 as viewed along a surface of revolution concentric to the axis of the wheel unit.

The mode of obtaining the wheel unit structure is further illustrated by FIG. 7 which illustrates a cross section of a mold and adjoining spokes 8 of a unit 5 taken along a surface of revolution with respct to the axis N—N. The mold 41 comprises mold halves 42, 43 separating at the parting line P—P. The relationship of draft with respect to the parting line is illustrated. Obviously, the channel surfaces of the rim 6 cannot be a portion of the mold halves 42, 43. A plurality of core pieces capable of defining the channel surface of the rim are inserted into the mold chamber prior to bringing the mold sections 42, 43 into position for molding which easily detach from the wheel unit after it is cast. The channel surface of the rim and the interior hub element surface of the casting are trued to the precise dimensions required for use by machining operations. For aesthetic purposes, the lateral surfaces of the rim and the spoke flange edges may be machine finished and, if desired, polished.

Figure 4:
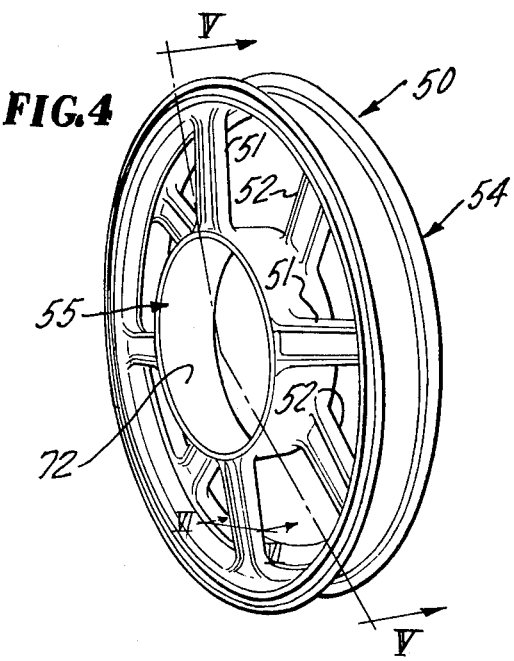
FIG. 4 is a perspective view of a modified wheel having two series of spokes in staggered relation.
Figure 2:
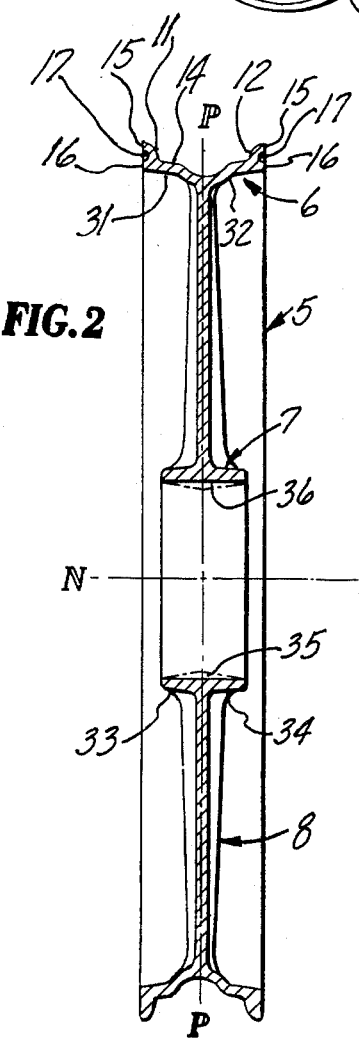
FIG. 2 is a cross section of the wheel unit of FIG. 1 taken along a diametral plane.
Figure 5:
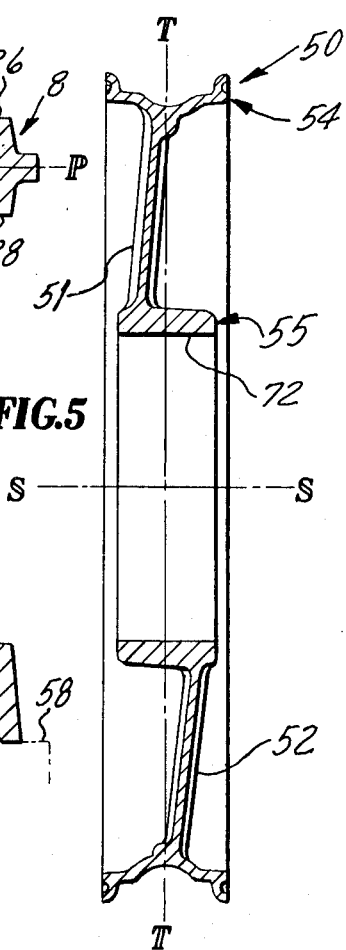
FIG. 5 is a cross section of the wheel of FIG. 4 taken along a diametral transaxial plane.

FIGS. 4, 5, 6 and 8 relate to a wheel unit 50 in which spokes 51, 52 join integrally with a rim 54 and a hub element 55 to form a one piece unit or casting. The essential difference between unit 50 and the previously described wheel unit 5 is in the arrangement of the spokes. Unit 50 is depicted with one set of four spokes 51 in angularly staggered relation with another set of four spokes 52. Viewed only in their angular location about the axis of rotation S—S of the wheel unit, the spokes of one set are located halfway between angularly adjacent spokes of the other set although other angular spacing arrangements are possible. FIG. 5 shows that the rim 54 also has grooves in the outer side surfaces of its side walls. The grooves are circularly continuous, as shown in FIG. 4.

The spokes of each set occur in a conical surface of revolution extending radially from the hub element 55 toward a transaxial central plane T—T of the wheel unit and thus in convergent relation with the surface of revolution of the other set of spokes. As shown, the junctions of the spokes of each set with the hub element 55 are spaced axially along the hub element at a greater distance from the transaxial plane T—T than their junctions with the rim 54. The spokes of each set approach but are just short of an intersection with plane T—T at junction with the rim. This arrangement results in an extremely deformation-resistant wheel in which somewhat smaller spokes may be used than are used in a wheel of similar size comprising the unit 5 under similar service conditions.

Figure 6:
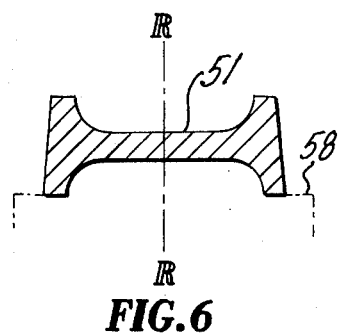
FIG. 6 is a cross section of a spoke taken along lines VI—VI of FIG. 4.

FIG. 6 illustrates that each of the spokes, e.g., spoke 51, is symmetrical with respect to a radial plane R—R which is parallel to, and contains, the axis of rotation S—S. Thus, the spokes may be said to extend in a radial direction while leaning in an axial direction toward the central plane T—T. Further to be noted from FIG. 6 is that the spokes 51, 52 are of I-beam cross section with the web of the spoke approximately bisected by the plane R—R and the surfaces of the flanges having mold-parting draft with respect to a mold parting line 58. This arrangement is better understood with reference to FIG. 8 in which is shown a fragmentary cross section of the mold 61 in enclosing relation with spokes 51, 52 of the wheel unit 50. The cross section is taken along a surface of revolution concentric to axis S—S as projected into a plane. The mold 61 comprises mold portions 62, 63 which may part with respect to the irregular parting line 58. It will be understood that any cross sections of the mold and the wheel unit taken at different radii from the axis S—S will depict a change in relative positions and cross section size of the spokes 51, 52 because of the convergence of the surfaces of revolution in which the spokes are contained and the tapering size of the spokes.

WHEEL UNITS AND HUB UNITS IN COMBINATION

Figure 9:
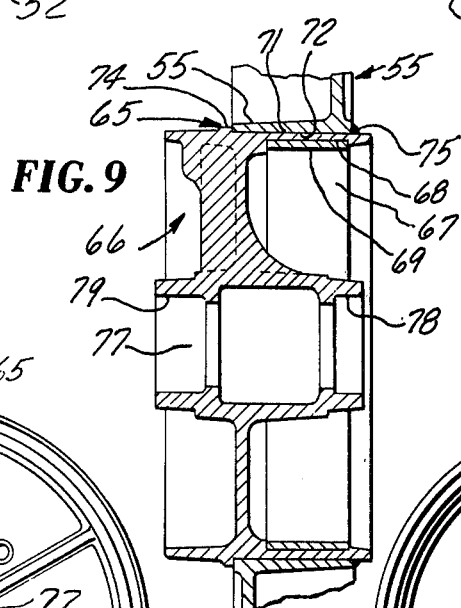
FIG. 9 is a fragmentary view in cross section taken along line IX—IX of FIG. 11 of a rear motorcycle hub unit shown in combination with a wheel unit of the type shown in FIGS. 4 and 5.

FIG. 9 depicts the wheel unit 50 in combination with a hub unit 65 adapted for use on a Kawasaki Motorcycle Model 803 manufactured in Akashi, Japan.

Figure 10:
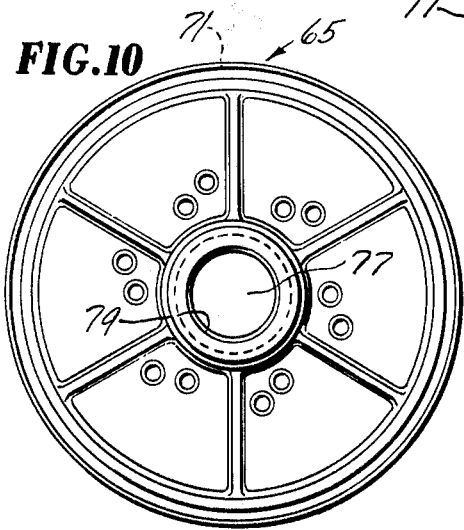
FIG. 10 is a view of the right side of the hub unit as shown in FIG. 9.

FIG. 10 illustrates the left side of the hub as seen in FIG. 9 and outlines pockets 66 of irregular contour adapted for receiving resilient blocks (not shown) of mechanism (not shown) for coupling the hub in drive relationship with drive apparatus of the motorcycle.

Figure 11:
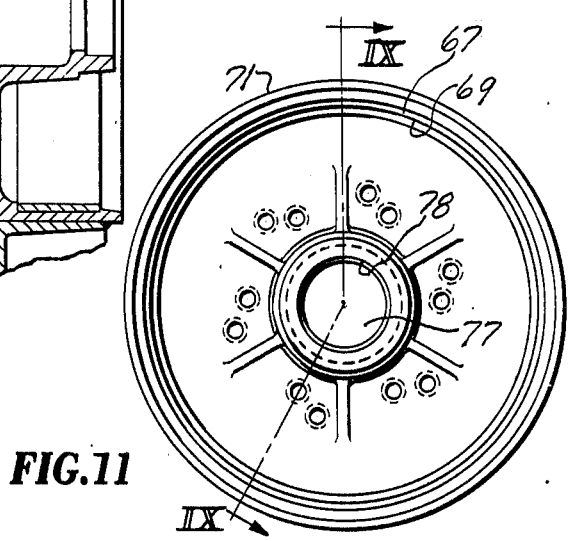
FIG. 11 is a left side view of the hub unit as viewed in FIG. 9.

FIG. 11 illustrates the right side of the hub as shown in FIG. 9 in which is formed an annular recess 67 for receiving brake mechanism. Fixedly seated on an interior drum surface 68 within the recess is a brake drum 69.

The unit 65 is formed with an outer finished cylindrical surface 71 having an interference fit with the interior cylindrical finished surface 72 of the wheel unit 50. The surface 71 terminates toward the left in a shoulder 74 which axially locates the wheel unit 50 on the hub unit 65. The interference fit not only accurately locates the bearing recesses 78 and 79 in coaxial relation to the rim of the wheel unit 50 but additionally provides high frictional resistance to relative rotation and relative axial movement of the wheel and hub units 50 and 65. The interference fit also serves to impose compressive preloading of the spokes of the wheel unit 50, as does the air pressure in a tire mounted on the rim of the wheel unit 50. As known, permanent mold and die castings generally have superior strength in compression as compared to tension, and hence, the present invention by reason of compressive preloading lessens the tensile stresses during use of the composite construction herein. The units 50, 65 are further secured from relative angular or axial movement by a weld 75 which joins with an end surface of the hub element 55 of wheel unit 50 and an adjacent portion of the cylindrical surface 71 of unit 65. Preferably another weld 75 will be provided at the other end of the hub element 55 and the adjoining shoulder 74. As evident, normal usage of the composite wheel and hub unit construction herein will not impose any stresses on the welds 75 whereas relative rotation and axial movement due abnormally high axial and torque loads are resisted by the welds 75.

The hub unit 65 further provides a central axially extending chamber 77 which provides bearing recesses 78, 79 for receiving and supporting a bearing and axle assembly by which the wheel comprising units 50 and 65 may be attached to a vehicle frame.

FIG. 9 shows that the hub element 55 of the wheel unit 50 is in immediate radial proximity with the brake drum 69 and therefore in excellent heat exchange relationship therewith. The wheel unit therefore acts as a heat reservoir and heat radiating facility for effectively dissipating heat from the brake area of the hub unit. The interior details of hub units other than special relationships, such as named above, with respect to the wheel unit in general are not of interest regarding this invention.

Figure 12:
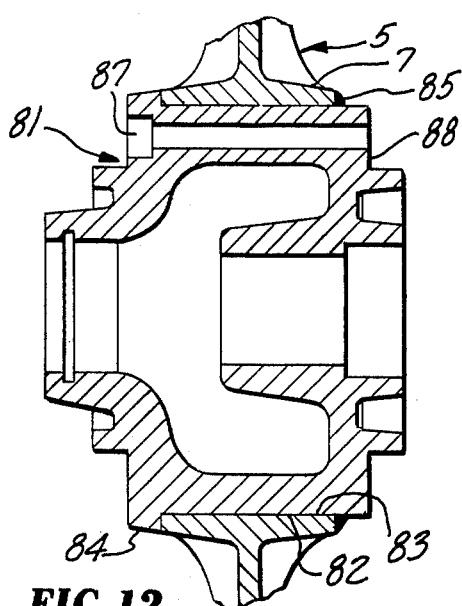
FIG. 12 is a fragmentary view in cross section taken along a transaxial diametral plane of a front motorcycle wheel having a hub unit received within a wheel unit of the type shown in FIGS. 1 and 2.
Figure 13:
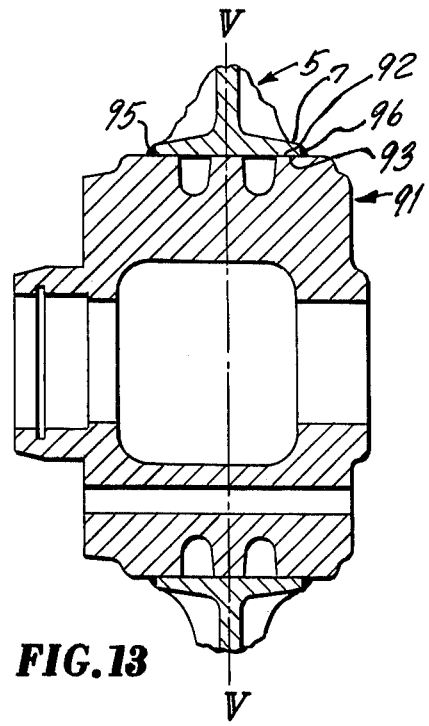
FIG. 13 is a fragmentary view in transaxial diametral cross section of a modified motorcycle front wheel having a hub unit received within a wheel unit of the type shown in FIGS. 1 and 2.

FIGS. 12 and 13 typify front wheel designs in accordance with the invention. As shown in FIG. 12, a front wheel hub unit 81 is shown in place within the wheel unit 5 with its exterior finished cylindrical surface 82 in tightly fitting frictionally engaged relation with the interior finished surface 83 of the hub element of unit 5. The hub unit 81 further provides a shoulder 84 against which the wheel unit is seated. Units 5 and 81 are secured from relative axial or angular movement against excessive axial and torque loads by a weld 85. Again, as in FIG. 9 the shoulder 84 will preferably be of smaller diameter than the hub element 7 for another weld 85 at the other end of the hub element 7 and the shoulder 84. A plurality of counterbored axially-extending bores 87 located along a circumference concentric to the hub axis accommodate bolts (not shown) by which an annular disc or other brake device is secured to the surface 88.

FIG. 13 illustrates a modified front motorcycle wheel comprising the wheel unit 5 and a hub unit 91 of modified design. As found in previous embodiments, the hub unit and the wheel unit have circumferentially mating surfaces 92 and 93, respectively, which provide an interference fit. During assembly, the hub unit 91 is pressed into the wheel unit 5 to the proper relative position such as by the use of a jig. The wheel unit 5 is preferably heated to 240° F. or more for receiving the hub unit 91. Upon cooling, the wheel unit 5 will shrink on the hub unit 91 to frictionally retain the wheel unit 5 and hub unit together against relative angular and axial movement. Thereupon the units are welded along opposite edges of the hub element by welds 95, 96 which join with the hub unit surface 92 and the end edges of the wheel unit. In connection with any of the embodiments herein described, it is to be understood that the wheel units of different design, as typified by those of FIGS. 1 and 4, are interchangeable for substantially any purpose.

Figure 14:
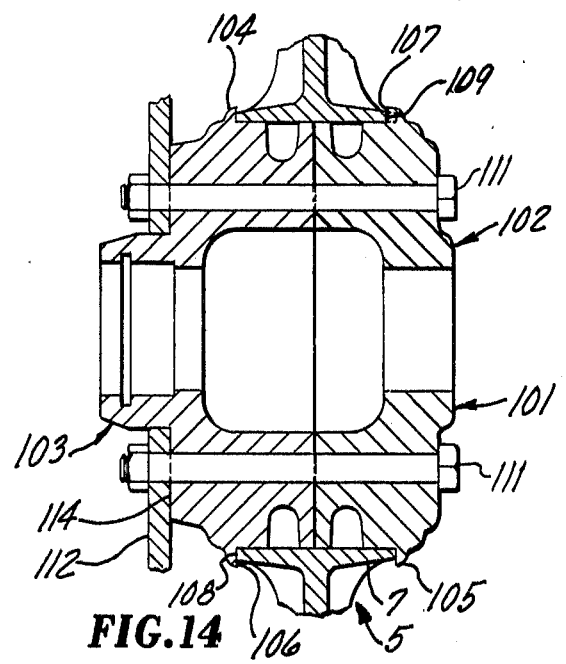
FIG. 14 is a fragmentary transaxial cross section of another modified wheel showing a transaxially split hub received in a wheel unit of a type described herein.

FIG. 14 illustrates another type of wheel possible by minor modifications of the wheel unit 5 and the hub unit 91 of FIG. 13. It may be noted that the hub unit 91 is simply split, and resulting axially separable hub sections or halves 102, 103 are formed with annular shoulders 104, 105 to form the modified split hub unit 101. The annular shoulders 102, 105 are formed with several axially extending tongues 106, 107, respectively. The wheel unit on the other hand is formed with axially indented notches 108, 109 which receive the tongues 106, 107 respectively.

As a result of this arrangement, the wheel unit 5 becomes firmly united with the hub unit 101 when the hub unit halves 102, 103 are inserted from opposite sides into the hub element 7 of unit 5 and bolts 111 are tightened to secure a brake disk 112 against surface 114 to bring the shoulders 104, 105 in tight engagement with end edge surfaces of the hub element 7 of unit 5. The tongues 106, 107 and notches 108, 109 prevent any relative angular movement of the units.

As before indicated, the preferred practice of producing wheels in accordance with the invention is to provide castings of weldable metals. A highly satisfactory aluminum alloy used in the manufacturing of the wheel and hub units described above is a commercially available alloy identified by numeral "A356" according to standard commercial nomenclature of Aluminum Manufacturers Association. This alloy is also identified by the American Society of Testing Materials designation "SG70B".

To start the manufacturing process, the wheel unit and the hub unit are provided as castings molded through the use of "permanent" metal molds with the hub element of the wheel unit potentially adapted to receive the unit. The mating surfaces of the units are not less than about four inches in diameter. Permanent molds yield a desired finish and quality in castings comprising one of the preferred weldable alloys.

The castings then undergo a heat treating program in which they are first heated to a T4 (commercial nomenclature) condition, i.e., heated to 1000° F. to 1100° F. for twelve hours and then quenched in warm water. They are then trued and shape-corrected by cold working. Thereafter, they are heat treated to a T6 condition, i.e., heated to 350° F. and held at this temperature four or five hours and then allowed to air cool.

The units are thus prepared for machining. With the center of the mass of the casting in mind, the wheel unit is chucked so that the hub element thereof is bored and the internal channel surface of the rim is finished in concentricity. The external lateral planate surfaces of the rim are machined to planes perpendicular to the axis of revolution of the wheel unit. The exterior drum surface of the hub unit is machined to a diameter at room temperature slightly larger than the internal diameter of the hub element of the wheel unit, and is otherwise prepared by machining, e.g., for receiving bearing races, a brake disc, cap screws, etc.

Assembly of the two units proceeds with heating of the wheel unit to a temperature appreciably higher than room temperature, e.g., in the range of 240° to 300° F. after which the hub unit is inserted into the heated hub element with both elements being relatively positioned within a revolvable jig of a welding machine. On cooling of the wheel unit, the wheel unit and hub unit are secured together ina "shrink fit". The jig and wheel assembly are then rotated while weld beads are applied within an inert or deoxygenated atmosphere to circular end surfaces of the hub element and circular surfaces of the hub unit adjacent to opposite ends of the hub element. The hub and wheel units are thus assembled into an integral wheel on the welding machine.

While it is preferred in the rear driving wheel of a motorcycle that the mating hub surfaces of the wheel unit and the hub unit be cylindrical and continuously engaged in an axial direction, the front undriven wheel is subject to less stress and may be constructed with a wheel unit of which axially-spaced end portions of its hub element which bear on a hub unit are of smaller diameter than an intermediate internal surface of not less than about one and one-half inches which does not engage the hub unit. The internal cylindrical end surfaces of the hub element will then be in the order of not less than approximately three-sixteenths of an inch in width exclusive of the associated welds.

The foregoing description is intended to point out those features of wheel structure which render the motorcycle wheels described herein substantially advantageous over the prior art motorcycle wheels, especially wire spoke wheels. Wheels such as described will result in the elimination of inner tubes from the motorcycle tires. This will not only reduce cost but render the sidewalls of the tires more flexible with greater road gripping capacity. The wheel herein described is greatly improved over prior art devices with regard to the overall strength of the wheel especially in the spoke and rim construction. The side wall construction of the rim is of particular interest. A wheel as described herein holds great promise for substantially reduced manufacturing costs on a mass-produced basis.

The construction of the wheel as two separate castings permanently joined by an interference fit and additionally by welds enables for the first time the successful application of casting technology to the manufacturing of a practical wheel cast from light metals. The wheel unit is constructed in such a manner that it can never become loose and unstable within its own structure, whereas the motorcycle wire wheels of the prior art in prevalent use are subject to deterioration resulting in a relatively short road life. Moreover, the wheels disclosed herein offer great flexibility to manufacturers in the combining of a few types of wheel units with a greater number of types of hub units. For the immediate future, the invention offers special interest for the purchaser in the so-called "after market" who seeks better equipment than that of standard merit normally occurring on the vehicle as originally equipped.

The composite wheel construction herein eliminates porosity and shrink fractures as previously discussed and moreover the shrink fit facilitates assembly of the wheel and hub units without use of anti-seizing compounds to provide high frictional resistance to relative angular and axial movement of the wheel and hub units.

The embodiments of the invention in which an exclusive property or privilege is claimed are defined as follows:

1. A method of making a motorcycle wheel comprising the steps of providing as castings of a weldable lightweight metal including aluminum, magnesium and alloys thereof, a hub unit, and a wheel unit having a centrally open tubular portion to receive said hub unit and having a concentric rim portion integrally connected to said tubular portion by angularly spaced-apart spokes; heat treating the castings to relieve casting stresses; machine finishing the units including finishing the circular end surfaces of said tubular portion and finishing the outer surface of the hub unit and the inner surface of the tubular portion of the wheel unit to provide substantially complimentary cylindrical surfaces of which said inner surface is slightly smaller in diameter than said outer surface at ambient temperature and slightly larger in diameter at an appreciably higher than ambient temperature when the hub unit means remains at ambient temperature; inserting the hub unit into said machined inner surface with said wheel unit heated sufficiently to receive the hub unit; cooling said wheel unit to shrink-fit it on said hub unit; and welding one circular end surface of the tubular portion around an end portion of said outer surface which projects axially beyond said one end surface while rotating said shrink-fitted wheel and hub units about the axis of said inner and outer surfaces.

2. The method of claim 1 wherein said step of machine finishing said inner and outer surfaces brings about a diameter relationship enabling insertion of said hub unit at ambient temperature into said wheel unit heated to a temperature in the range of 240° F. to 300° F.

3. The method of claim 1 wherein said step of machine finishing said hub unit includes finishing a collar portion at the other end of said outer surface which abuts the other circular end surface for locating said units in predetermined axial relationship.

4. The method of claim 1 wherein said step of machine finishing said hub unit includes finishing a collar portion at the other end of said outer surface which abuts the radially inner portion of the other circular end surface when said hub unit is inserted into said wheel unit; and wherein the radially outer portion of said other circular end surface is welded around the periphery of said collar portion while said units are rotated as aforesaid.

* * * * *